April 10, 1962  J. ISREELI  3,028,965
DIALYSIS APPARATUS
Filed April 21, 1958  2 Sheets-Sheet 1
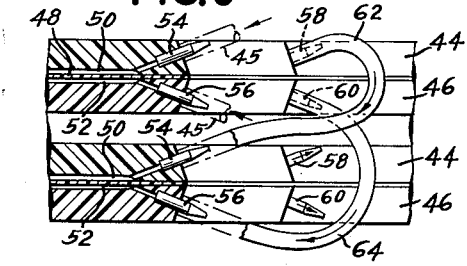
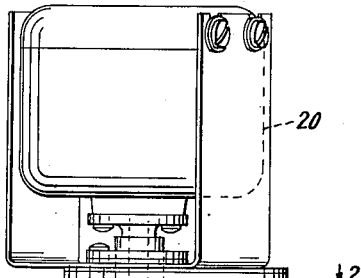
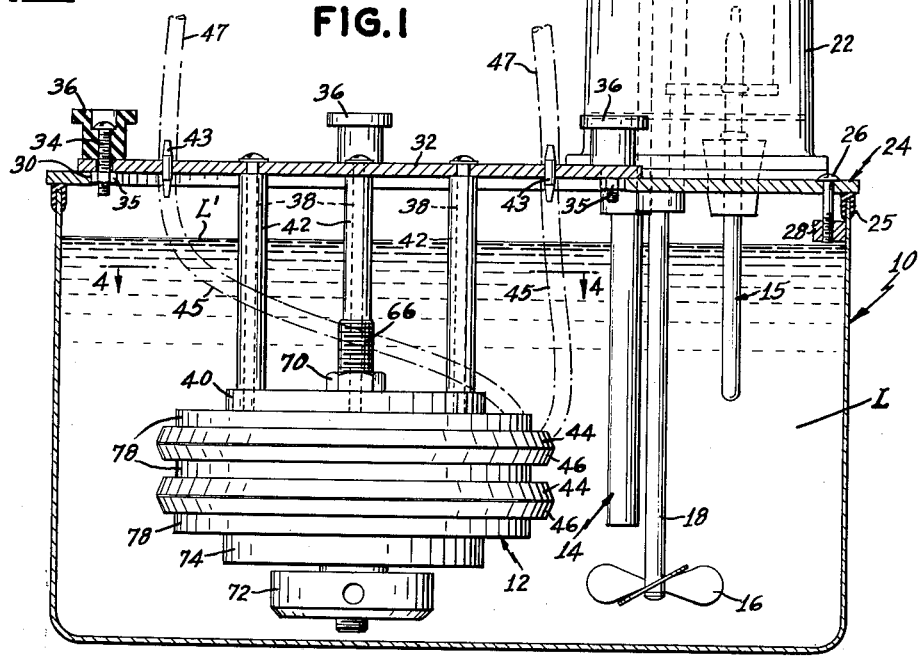
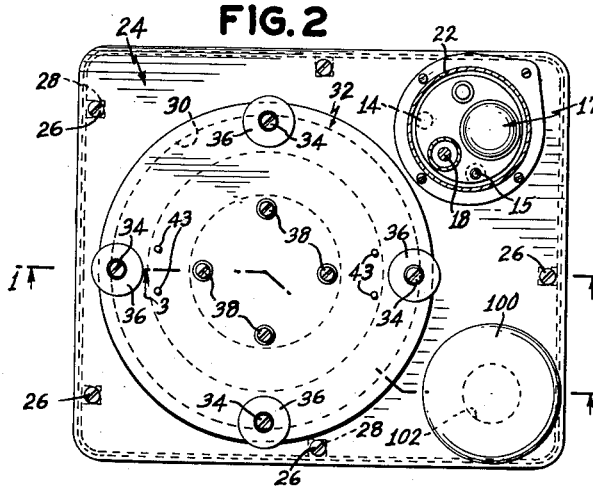
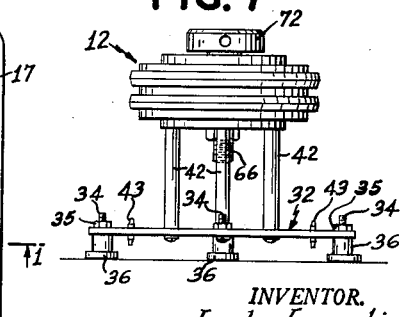
INVENTOR.
Jack Isreeli
BY
ATTORNEYS April 10, 1962 J. ISREELI 3,028,965
DIALYSIS APPARATUS
Filed April 21, 1958 2 Sheets-Sheet 2
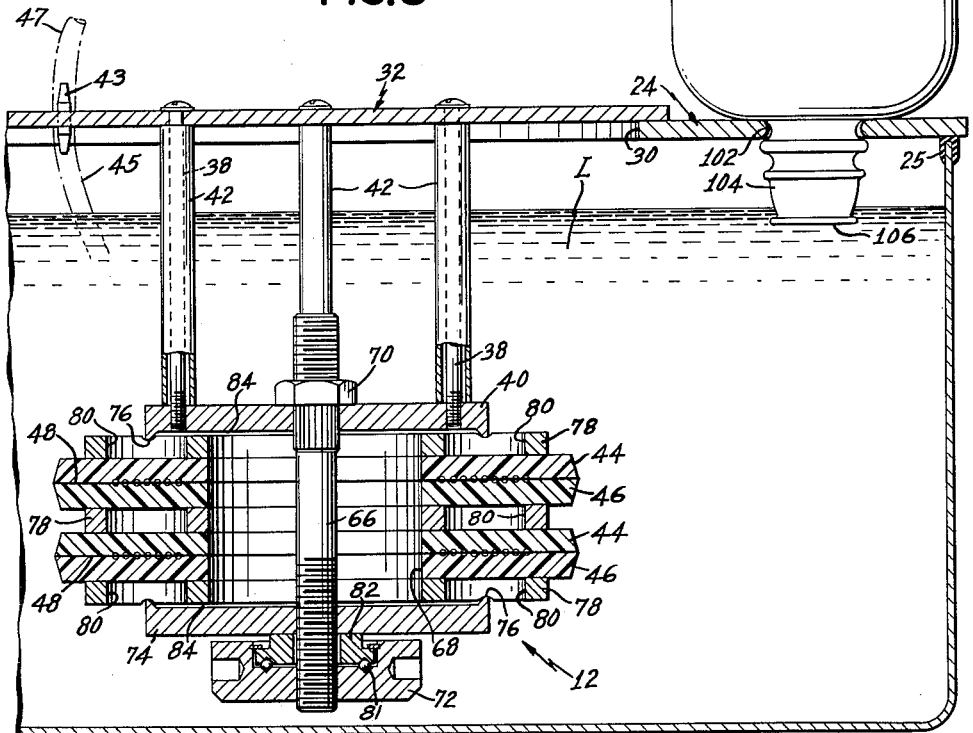
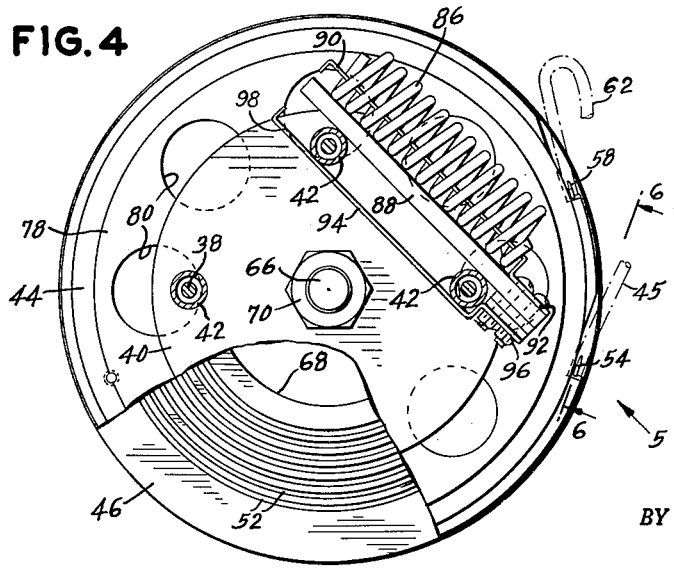
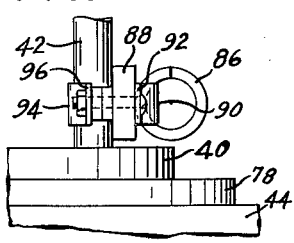
INVENTOR.
Jack Isreeli
BY
ATTORNEYS

United States Patent Office 3,028,965
Patented Apr. 10, 1962

3,028,965
DIALYSIS APPARATUS
Jack Isreeli, Tuckahoe, N.Y., assignor to Technicon Instruments Corporation, Chauncey, N.Y., a corporation of New York
Filed Apr. 21, 1958, Ser. No. 729,724
10 Claims. (Cl. 210—149)

The present invention relates to dialysis apparatus, and more particularly to dialysis apparatus comprising a dialyzer which has provision for the flow of streams of fluids therethrough at opposite sides, respectively, of the membrane of the dialyzer for the diffusion by dialysis of a substance contained in a stream of fluid flowing through the dialyzer at one side of said membrane into a stream of fluid flowing through the dialyzer at the other side of the membrane.

The performance of various methods involving the use of a dialyzer of the above indicated type, for example in analysis, control, monitoring or other operations, is based upon the phenomenon that the quantity of a substance which diffuses through the dialyzer membrane from a stream of liquid flowing through the dialyzer at one side of said membrane into a stream of liquid which flows through the dialyzer at the other side of the membrane is proportional to the quantity of said substance in said first mentioned stream. It is important to maintain a uniform rate of dialysis for such substance, for if the rate of dialysis varies the proportion of the substance which diffuses through the dialyzer membrane varies and on that account said analytical operations may not be as accurate as required in certain cases.

The primary object of the present invention, therefore, is the provision of means operatively associated with a dialyzer for maintaining the rate of dialysis constant for a particular substance to be separated from a stream of liquid by diffusion through the same membrane of a dialyzer, irrespective of variations in ambient temperature during the flow of the fluid streams through the dialyzer, in the operation of the apparatus.

An ancillary object of the invention is to provide means simple in construction and reliable in operation to assure the operation of the dialyzer at a constant predetermined temperature irrespective of variations in ambient temperature, namely, variations in the temperature of the room or part of the room or laboratory in which the apparatus is located during the operation thereof.

The above and other objects, features and advantages of the present invention will be fully understood from the following description considered in connection with the accompanying drawings which are illustrative of the presently preferred mode of practicing this invention.

In the drawings:

FIG. 1 is a vertical sectional view, taken on the line 1—1 of FIG. 2 and on a larger scale, of a dialysis apparatus embodying the present invention;

FIG. 2 is a top plan view of the apparatus as observed from the line 2—2 of FIG. 1;

FIG. 3 is a fragmentary sectional view of the apparatus, on a larger scale, on the line 3—3 of FIG. 2;

FIG. 4 is a horizontal plan view on the line 4—4 of FIG. 1, a part of one of the dialyzer plates being cut away for the purposes of illustration;

FIG. 5 is a fragmentary end elevational view of part of the apparatus as viewed from the arrow 5 of FIG. 4;

FIG. 6 is a sectional view on a larger scale on the line 6—6 of FIG. 4;

FIG. 7 is a side view, in elevation, of the dialyzer and its support, removed from the casing of the apparatus and disposed in inverted position.

Referring now to the drawings in detail, the dialyzer apparatus of the present invention comprises a receptacle 10 adapted to contain a body of water or other liquid L in which the dialyzer 12 is completely immersed. An electric heater 14 of any suitable construction is also immersed in the body of liquid for heating the latter to a predetermined temperature, and said heater is operable under the control of a thermostat 15 for maintaining said liquid at a constant predetermined temperature. Any suitable thermostatic device may be employed but as indicated in FIGS. 1 and 2, the thermostat 15 controls the operation of a relay 17 which, in turn, controls the circuit of heater 14. A stirrer 16 provided at the lower end of a rotary shaft 18 operated by an electric motor 20 serves to maintain the liquid L in a state of turbulence during the operation of the apparatus and is thereby effective in conjunction with the heater 14 to maintain the liquid L at a substantially uniform temperature in the vicinity of the various parts of the dialyzer 12 and the devices associated therewith so that the various parts of the dialyzer are maintained at substantially the same predetermined temperature according to the control of the heater 14 by said thermostatic device. The heater 14, the thermostatic device 15, 17 and the motor 20 are supported by a bracket 22 mounted on the receptacle cover 24. However, said heater and thermostatic device may be mounted on cover 14 at any available place independently of motor bracket 22. A resilient gasket 25 which is U-shaped in cross section is interposed between the upper edge of receptacle 10 and its cover 24 for providing a fluid-tight joint between the receptacle and said cover. A plurality of screws 26 pass through said cover and are threaded into companion bosses 28 on the upper inner wall portion of the receptacle for securing said cover in position.

Cover 24 is provided with a circular opening 30 through which the dialyzer 12 and the parts assembled as a unit therewith in the interior of the receptacle may be inserted and removed. Said dialyzer is supported by plate 32 which also constitutes a cover for said opening 30. As illustrated in FIG. 1, the marginal edge portion of plate 32 rests on the upper marginal surface of cover plate 24 around opening 30. Cover plate 32 is provided with a plurality of circumferentially spaced bolts 34 by which the resilient rubber members 36, hereinafter more particularly described, are secured in position. The nuts 35 on the inner end portions of said bolts are positioned adjacent the inner edge of cover 24 which defines the opening 30 therein and serves to prevent displacement of cover plate 32 in its own plane when said cover plate rests on cover 24.

The dialyzer 12 is supported by the plate 32 by means of a plurality of, here shown as four, rods 38 the lower ends of which are screwed into the clamping member 40 of the dialyzer 12. Each rod extends through a spacing tube 42 the opposite ends of which engage clamping member 40 and the inner surface of cover plate 32. Said cover plate is provided with a plurality of nipples 43 which are fixed in said cover plate and have opposite end portions projecting from the inner and outer surfaces thereof for the attachment thereto of flexible tubing 47 at the outer side of cover plate 32 and flexible tubing 45 at the inner side of said cover plate to provide tubular passages for the flow of the liquid streams into and out of the dialyzer at each side of the membrane thereof.

The dialyzer 12 is preferably of the construction shown and described in my United States application Serial No. 655,093 filed April 25, 1957, now Patent No. 2,864,507. Briefly described, the dialyzer comprises the companion plates 44 and 46 between which a semi-permeable dialyzer membrane 48 is clamped (FIG. 6). The confronting surfaces of plates 44 and 46 are provided with continuous spiral grooves 50 and 52 respectively (FIG. 4), the groove 50 of plate 44 being in alignment with the groove 52 of the companion plate 46 and in mirror relation to the latter and separated from each other by the semi-permeable membrane 48. Plates 44 and 46 are provided with inlet nipples 54 and 56 respectively (FIG. 6) for the connection thereto of the fluid conducting tubes referred to above, and with outlet nipples 58 and 60 respectively likewise provided for the connection of fluid conducting tubes thereto. Preferably, but not necessarily, the dialyzer comprises a plurality of dialyzer units each composed of a pair of said companion plates 44—46 and an interposed semi-permeable membrane 52, the outlet 58 of one of the plates 54 being connected to the inlet 54 of the other dialyzer plate 44, by a flexible tube 62 and the outlet 60 of one of the plates 46 being connected to the inlet nipple 56 of the other dialyzer plate 46 by the flexible tube 64. When a plurality of sets of dialyzer plates are employed, the outlet nipples 58 and 60 of the plates 44 and 46 of the last dialyzer are connected to two of the nipples 43 in the cover plate 32, and it will be understood that the other two nipples 43 of the cover plate 32 are provided for the connection of the fluid supply tubes to the opposite sides respectively of the first dialyzer, i.e., to the nipples 54 and 56 respectively of the upper set of plates 44 and 46 as illustrated in FIGURE 6.

The dialyzer plates 44 and 46 are preferably translucent or transparent so that the flow of the fluids through the dialyzer may be readily observed and for that purpose are made of "Lucite" or other suitable plastic, and if desired, an observation window (not shown) may be provided in cover plate 32. The dialyzer plates are held in releasably clamped relation by a clamping rod 66 which extends through a central opening 68 in the dialyzer plate assembly, as clearly illustrated in FIGURE 3, which have the threaded portions shown engaged by nuts 70 and 72 for exerting clamping pressure against the above mentioned clamping plate 40 which engages the dialyzer plate 44 and against the clamping plate 74 against the dialyzer plate 46. Each of the clamping plates 40 and 74 is provided with a peripheral rib 76 which engages one side of a pressure plate 78 having a plurality of circumferentially spaced openings 80 therethrough whereby said plate 78 is somewhat flexible and is therefore operable to distribute the clamping pressure substantially evenly against the adjacent surface of the adjacent dialyzer plate, namely plate 44 in the case of clamping member 40 and the companion pressure plate 78, and plate 46 in the case of pressure member 76 and the companion pressure plate 78. When two sets of dialyzer plates are employed a third pressure plate 78 is interposed between the adjacent dialyzer plates of the two sets for equalizing the clamping pressure on plate 46 of one set and the adjacent plate 44 of the other set. The clamping nut 72 is operable to exert its clamping pressure against the companion clamp member 74 through a ball bearing 81 which is interposed between said clamping nut 72 and a clamping member 82 the inner end surface of which frictionally engages the outer surface of clamping member 74. The provision of the ball bearing 81 between the clamping nut 72 and the friction member 82, which as illustrated in FIGURE 3 is not in engagement with clamping rod 66, facilitates the turning of the clamping nut 72 into and out of clamping relation to member 74, through bearing 81 and member 82, while at the same time being operative to provide an effective clamping action.

It will be noted by reference to FIGURE 3 that the inner surfaces 84 of the clamping members 40 and 74 are spaced from the adjacent ends of the companion pressure members 78, respectively, so that when the dialyzer assembly is immersed in the liquid in receptacle 10 there is a fluid passage through the central opening 68 through the spaces or clearances between the clamping members 40 and the companion pressure members 78 and through the openings 80 in said last mentioned members, respectively, so that the various surface portions of the dialyzer are exposed directly to the liquid in said receptacle 10 whereby to improve the isothermal characteristic of the dialyzer in the various parts thereof.

Pursuant to the present invention, according to the preferred embodiment thereof, provision is made for bringing the temperature of the fluid to a constant temperature before entering the dialyzer. For this purpose a coil 86 is interposed in the fluid line leading from the fluid supply for each side of the dialyzer. More particularly, a coil 86 is interposed in the conduit leading from one of the nipples 43 to the inlet nipple 54 of the dialyzer plate 44, and a similar coil is interposed between another nipple 43 and the inlet nipple 56 of the companion dialyzer plate 46. Each of said coils is immersed in the liquid L in the receptacle 10 so that as the fluid flows through said coil on its way to the dialyzer said fluid is at a uniform temperature substantially the temperature of the fluid within the dialyzer. Thus, coil 86 acts as a temperature equilibrating device in respect to the temperature of the fluid within the dialyzer. Coil 86 is preferably formed of glass and is in the form of a helix, but it will be understood that said coil may be formed of other materials inert to the fluids passing therethrough, and in respect to the broad aspects of the present invention it will be understood that said coil may be of a different configuration, although, the helical formation is advantageous and is therefore preferred. More specifically, in this connection, coil 86 also preferably constitutes a mixing coil for effecting a thorough mixture of a plurality of liquids which may be admitted to the inlet end of said coil in accordance with certain methods of analysis for which the dialyzer of the present invention is especially suitable for advantageous use. As illustrated by FIGS. 4 and 5 coils 86 are releasably mounted on a pair of spacing tubes 42. For this purpose coil 86 is mounted on a bar or strip 88 of a plastic or other suitable material, being releasably held in position on said bar by a spring strip 90 which is secured at one end 92 to said bar in any suitable way and which extends through the coil and holds the latter with spring pressure against the confronting surface of said bar. A spring member 94 is secured at one end 96 thereof to bar 88 and has a free end portion 98 at its opposite end, whereby spring strip 94 is effective to releasably engage a pair of supporting tubes 42, as clearly illustrated in FIGURE 4.

The receptacle 10 is provided with means for automatically replenishing liquid in the case of loss by evaporation or otherwise, during the operation of the apparatus. For this purpose a bottle or other suitable receptacle 100 (FIGS. 2 and 3) is mounted in inverted position on cover 24 which is provided with an opening 102 through which the neck 104 of the bottle projects. It will be understood, of course, that the outer end of the bottle neck 104 is positioned at the desired level L' of the liquid in the receptacle so that said level drops below the end 106 of the bottle neck liquid from the bottle is automatically admitted, in a well understood way, in the receptacle until the level of liquid therein is restored. Bottle 100 is preferably translucent and for that purpose is made of glass or a suitable plastic, such as polyethylene, so that said bottle not only serves as means for providing a constant liquid level in receptacle 10 but also constitutes means to indicate when the liquid level in the receptacle 10 drops below the desired predetermined level, it being understood of course that if no liquid is visible in the bottle 100 it is an indication realized that the liquid level in the receptacle 10 is too low.

It will be noted that the dialyzer 12 and the parts assembled therewith, including the coils 86 may be inserted in the receptacle 10 and removed therefrom through opening 30, as a unit, including the tubes which connect the inner ends of the nipples 43 to the dialyzer. Also, as illustrated in FIGURE 7, it will be noted that when the dialyzer is positioned externally of the receptacle 10, the assembly including the cover plate 32 which is in unitary relation with the dialyzer 12 may be conveniently placed on a suitable support with the dialyzer plates and the clamping nut 72 uppermost. This arrangement greatly facilitates the disassembly and the assembly of the dialyzer plates and associated parts when it is desired to replace the dialyzer membrane, or to clean the dialyzer passages, or to connect the tubings thereto or for any other purpose.

In the above described form of the invention, the heater 14 and its thermal control 15, 17 are shown mounted as a unit with the stirrer motor 20, but if desired the heater 14 and its thermal control 15, 17 may be mounted as a unit separately from the motor 20. Also, if desired the water supply receptacle 100 may be of rectangular cross section so as to take up less room for the same volumetric capacity. When the heater 14 and the thermal control 15, 17 are mounted separately from the motor 20, this unit may be positioned at the location of the receptacle 100 illustrated by FIGURE 2 and the rectangular water supply receptacle may be positioned in the space between the stirrer motor and the heater and thermal control unit.

It will be noted that as illustrated in FIG. 3, the dialyzer is completely submerged in the liquid L, and accordingly a minute quantity of the liquid L comes in contact with the membrane of the dialyzer, by capillary attraction, between the dialyzer plates 44 and 46. While the quantity of water which thus comes in contact with the membrane is very small and hence does not affect the dialysis operation of the apparatus, it is sufficient to maintain the dialyzer membrane sufficiently moist to prevent the membranes from drying out, and for this reason the useful life of the membrane is considerably increased.

While the dialysis apparatus of the present invention may be used for various purposes in analysis or other processes, this apparatus is especially useful in practicing the method described in United States Patent No. 2,797,149 for Methods of and Apparatus for Analyzing Liquids Containing Crystalloid and Non-Crystalloid Constituents.

While I have shown and described the preferred mode of practicing the present invention it will be understood that this invention may be practiced otherwise and as herein specifically illustrated and described and that in the embodiment of the invention herein shown or described certain changes may be made therein and will occur to persons skilled in the art, in view of the present disclosure. Accordingly I do not wish to be limited precisely to the invention as herein shown or described except to the extent which may be required by the scope of the claims.

Having thus described my invention, what I claim and desire to secure by Letters Patent, is:

1. The combination with a dialyzer, said dialyzer having a membrane and means for the flow of separate streams of fluids therethrough at opposite sides, respectively, of said membrane for the diffusion by dialysis of a substance in a stream of fluid flowing at one side of the membrane into a stream of fluid flowing at the other side of the membrane; of temperature control means for preventing variations in the temperature at which said dialysis occurs in order to maintain the rate of dialysis of said substance substantially constant, said temperature control means comprising means for containing a body of liquid in which said dialyzer is immersed and means for maintaining said liquid at a substantially uniform predetermined temperature; and fluid conduit means positioned externally of the dialyzer and connected thereto at opposite sides of said membrane, respectively, for conducting the streams of fluids to the dialyzer for flow therethrough, said fluid conduit means being also immersed in said body of liquid and being of sufficient length to equilibrate the temperature of the fluids entering the dialyzer to the temperature of the fluids within the dialyzer during the flow of the fluid streams therethrough.

2. Dialysis apparatus, comprising a dialyzer having a membrane and a fluid inlet and a fluid outlet at each side of said membrane, a receptacle for a body of liquid, means for mounting said dialyzer within said receptacle for immersion in said body of liquid during the operation of the dialyzer, fluid-supply conduit means extending into said receptacle and connected to said fluid inlets of said dialyzer at opposite sides, respectively, of its membrane, for conducting separate streams of fluid to the dialyzer, fluid-exhaust conduit means connected to said fluid outlets of said dialyzer at opposite sides, respectively, of its membrane for the flow of the fluid streams from the dialyzer and extending out of said receptacle, and means for maintaining said body of liquid at a substantially uniform temperature in order to maintain the rate of dialysis substantially constant.

3. Dialysis apparatus, comprising a dialyzer having a membrane and a fluid inlet and a fluid outlet at each side of said membrane, a receptacle for a body of liquid, means for mounting said dialyzer within said receptacle for immersion in said body of liquid during the operation of the dialyzer, fluid-supply conduit means extending into said receptacle and connected to said fluid inlets of said dialyzer at opposite sides, respectively, of its membrane, for conducting separate streams of fluid to the dialyzer, fluid-exhaust conduit means connected to said fluid outlets of said dialyzer at opposite sides, respectively, of its membrane for the flow of the fluid streams from the dialyzer and extending out of said receptacle, and means for maintaining said body of liquid at a substantially uniform temperature in order to maintain the rate of dialysis of said substance substantially constant, said last mentioned means comprising an electric heater disposed within said receptacle for heating said liquid, and a thermostatic device responsive to the temperature of said liquid for controlling the operation of said heater.

4. Dialysis apparatus, comprising a dialyzer having a membrane and a fluid inlet and a fluid outlet at each side of said membrane, a receptacle for a body of liquid, means for mounting said dialyzer within said receptacle for immersion in said body of liquid during the operation of the dialyzer, fluid-supply conduit means extending into said receptacle and connected to said fluid inlets of said dialyzer at opposite sides, respectively, of its membrane for conducting separate streams of fluid to the dialyzer, fluid-exhaust conduit means connected to said fluid outlets of said dialyzer at opposite sides, respectively, of its membrane for the flow of the fluid streams from the dialyzer and extending out of said receptacle, said fluid-supply conduit means comprising coils of tubing positioned in said receptacle and immersed in said body of liquid to equilibrate the temperature of the fluids entering the dialyzer to the temperature of the fluids within the dialyzer during the flow of the fluid streams therethrough, and means for maintaining said body of liquid at a substantially uniform temperature.

5. Dialysis apparatus, comprising a dialyzer having a membrane and a fluid inlet and a fluid outlet at each side of said membrane, a receptacle for a body of liquid, means for mounting said dialyzer within said receptacle for immersion in said body of liquid during the operation of the dialyzer, fluid-supply conduit means extending into said receptacle and connected to said fluid inlets of said dialyzer at opposite sides, respectively, of its membrane, for conducting separate streams of fluid to the dialyzer, fluid-exhaust conduit means connected to said fluid outlets of said dialyzer at opposite sides, respectively, of its membrane for the flow of the fluid streams from the dialyzer and extending out of said receptacle, thermostatically controlled means for heating said body of liquid for maintaining it at a substantially uniform temperature, and means disposed in said receptacle for maintaining said body of liquid in motion in relation to said heating means and said dialyzer.

6. Dialysis apparatus, comprising a dialyzer having a membrane and a fluid inlet and a fluid outlet at each side of said membrane, a receptacle for a body of liquid, means for mounting said dialyzer within said receptacle for immersion in said body of liquid during the operation of the dialyzer, fluid-supply conduit means extending into said receptacle and connected to said fluid inlets of said dialyzer at opposite sides, respectively, of its membrane, for conducting separate streams of fluid to the dialyzer, fluid-exhaust conduit means connected to said fluid outlets of said dialyzer at opposite sides, respectively, of its membrane for the flow of the fluid streams from the dialyzer and extending out of said receptacle, said dialyzer comprising a plurality of internally grooved plates between which the dialyzer membrane is clamped in fluid tight relation for providing the fluid passages through the dialyzer at each side of the membrane, the fluid passage at one side of the membrane being in alignment with the fluid passage at the other side, said plates also having aligned openings therethrough for the passage of said liquid therethrough, means for maintaining said body of liquid at a substantially uniform temperature, and means for maintaining said body of liquid in motion around said dialyzer and through said openings in the dialyzer plates.

7. Dialysis apparatus, comprising a dialyzer having a membrane and a fluid inlet and a fluid outlet at each side of said membrane, a receptacle for a body of liquid, means for mounting said dialyzer within said receptacle for immersion in said body of liquid during the operation of the dialyzer, fluid-supply conduit means extending into said receptacle and connected to said fluid inlets of said dialyzer at opposite sides, respectively, of its membrane for conducting separate streams of fluid to the dialyzer, fluid-exhaust conduit means connected to said fluid outlets of said dialyzer at opposite sides, respectively, of its membrane for the flow of the fluid streams from the dialyzer and extending out of said receptacle, and means for maintaining said body of liquid at a substantially uniform temperature, and liquid supply means responsive to the lever of liquid in said receptacle for maintaining said liquid at a predetermined level.

8. The combination with a dialyzer, said dialyzer having a membrane and means for the flow of separate streams of fluids therethrough at opposite sides, respectively, of said membrane for the diffusion by dialysis of a substance in a stream of fluid flowing at one side of the membrane into a stream of fluid flowing at the other side of the membrane; of temperature control means for preventing variations in the temperature at which said dialysis occurs in order to maintain the rate of dialysis of said substance substantially constant, said temperature control means including a chamber in which said dialyzer is disposed and thermostatically controlled heating means disposed in said chamber for maintaining fluid at a constant temperature about said dialyzer in said chamber, said dialyzer including means for separating said flowing streams of fluid from said fluid about said dialyzer in said chamber.

9. Dialysis apparatus, comprising a dialyzer having a membrane and means for the flow of separate streams of fluids therethrough at opposite sides, respectively, of said membrane for the diffusion by dialysis of a substance in a stream of fluid flowing at one side of the membrane into a stream of fluid flowing at the other side of the membrane, a receptacle for a body of liquid, means for removably mounting said dialyzer within said receptacle for immersion in said body of liquid during the operation of the dialyzer, said receptacle having a top opening for the insertion of the dialyzer as a unit into said receptacle and for its removal as a unit from said receptacle, said mounting means comprising a cover for said opening, means supporting said dialyzer on said cover at the inner side thereof, and means for maintaining said body of liquid at a uniform temperature, said dialyzer including means for separating said separate streams of fluids from said body of liquid.

10. Dialysis apparatus, comprising a dialyzer having a membrane and means for the flow of separate streams of fluids therethrough at opposite sides, respectively, of said membrane for the diffusion by dialysis of a substance in a stream of fluid flowing at one side of the membrane into a stream of fluid flowing at the other side of the membrane, a receptacle for a body of fluid, means for mounting said dialyzer within said receptacle for immersion in said body of fluid during the operation of the dialyzer, fluid supply conduit means extending into said receptacle and connected to said dialyzer at opposite sides, respectively, of its membrane for transmitting sad separate streams of fluids to said dialyzer, fluid-exhaust conduit means connected to said dialyzer at opposite sides, respectively, of its membrane and extending out of said receptacle for transmitting said separate streams of fluids from said dialyzer, and means for maintaining said body of fluid at a substantially uniform temperature in order to maintain the rate of dialysis substantially constant during the flow of said streams of fluids through the dialyzer, said dialyzer including means for separating said streams of fluids from said body of fluid.

References Cited in the file of this patent

UNITED STATES PATENTS 2,252,213 Skolnik _____ Aug. 12, 1941

OTHER REFERENCES

American Instrument Company Catalog 48, page 10, copyright 1948, American Instrument Company, Silver Spring, Md.

Cottier et al.: "Erste Erfahrungen mit der künstlichen Niere von Alwall," Helvetica Media Acta, November 1957, vol. 24, No. 4, page 515.